United States Patent
Groetzner et al.

(10) Patent No.: US 11,782,623 B2
(45) Date of Patent: Oct. 10, 2023

(54) TRANSFERRING AN OPERATING IMAGE INTO A MULTI-TENANT ENVIRONMENT

(71) Applicant: INTERNATIONAL BUSINESS MACHINES CORPORATION, Armonk, NY (US)

(72) Inventors: Michael Groetzner, Stuttgart (DE); Norman Christopher Böwing, Boeblingen (DE); Juliet Candee, Brewster, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

(21) Appl. No.: 17/121,984

(22) Filed: Dec. 15, 2020

(65) Prior Publication Data
US 2022/0188004 A1    Jun. 16, 2022

(51) Int. Cl.
*G06F 3/06* (2006.01)
*G06F 9/4401* (2018.01)
*G06F 9/50* (2006.01)

(52) U.S. Cl.
CPC .......... *G06F 3/0644* (2013.01); *G06F 3/0604* (2013.01); *G06F 3/067* (2013.01); *G06F 3/0635* (2013.01); *G06F 3/0646* (2013.01); *G06F 3/0665* (2013.01); *G06F 9/4406* (2013.01);
(Continued)

(58) Field of Classification Search
CPC .... G06F 3/0644; G06F 3/0604; G06F 3/0635; G06F 3/0646; G06F 3/0665; G06F 3/067; G06F 9/4406; G06F 9/4411; G06F 9/5077
See application file for complete search history.

(56) References Cited

U.S. PATENT DOCUMENTS 7,752,437 B1 * 7/2010 Thakur ............... H04L 67/1097 370/235
7,801,973 B1 * 9/2010 Thakur ............... H04L 67/1097 709/219
(Continued)

OTHER PUBLICATIONS

International Search Report and Written Opinion for PCT/EP2021/081983 dated Feb. 16, 2022 (12 pages).
(Continued)

*Primary Examiner* — Ninos Donabed
(74) *Attorney, Agent, or Firm* — Jeffrey Ingalls, Esq.; Blanche E. Schiller, Esq.; Heslin Rothenberg Farley & Mesiti P.C.

(57) ABSTRACT

A partition function is transferred from a source system to a multi-tenant target environment. The transfer is executed from a source system to a multi-tenant target environment. Physical and logical input/output (I/O) configuration settings of a partition image are separated on the source system, moving logical I/O configuration settings from the source system to a remote multi-tenant target environment. A dedicated target system of the remote multi-tenant target environment is selected. Physical information about hardware and connections of the dedicated target system are added to the logical I/O configuration settings. The logical I/O configuration settings combined with the physical information in the target system are activated. An operating system with the activated logical I/O configuration is started such that the partition function is transferred.

20 Claims, 9 Drawing Sheets

(52) U.S. Cl.
CPC .......... *G06F 9/4411* (2013.01); *G06F 9/5077* (2013.01)

(56) References Cited

U.S. PATENT DOCUMENTS

| | | | |
|---|---|---|---|
| 7,895,295 B1* | 2/2011 | Thakur | H04L 67/1097 709/219 |
| 7,941,804 B1* | 5/2011 | Herington | G06F 9/5083 718/104 |
| 8,230,204 B2 | 7/2012 | Rostampour | |
| 8,417,796 B2 | 4/2013 | Crosbie | |
| 8,510,429 B1* | 8/2013 | Thakur | H04L 41/0826 709/224 |
| 8,924,499 B2 | 12/2014 | Allen et al. | |
| 8,984,104 B2 | 3/2015 | Morgan | |
| 9,087,001 B1* | 7/2015 | Christensen | G06F 9/4416 |
| 9,154,366 B1* | 10/2015 | Martin | H04L 69/329 |
| 9,294,585 B2 | 3/2016 | Druet et al. | |
| 9,483,258 B1* | 11/2016 | Labat | G06F 9/505 |
| 10,747,635 B1* | 8/2020 | Trachtman | G06F 11/0793 |
| 2006/0026587 A1 | 2/2006 | Lemarroy et al. | |
| 2006/0036658 A1* | 2/2006 | Henrickson | G06F 11/1458 714/E11.122 |
| 2006/0036890 A1* | 2/2006 | Henrickson | G06F 11/1464 714/2 |
| 2006/0263152 A1* | 11/2006 | Conroy | E02D 1/00 405/303 |
| 2007/0220248 A1 | 9/2007 | Bittlingmayer et al. | |
| 2007/0260621 A1* | 11/2007 | Smolen | G06F 16/2308 |
| 2010/0115131 A1 | 5/2010 | Eisenhauer et al. | |
| 2010/0250883 A1* | 9/2010 | Oshida | G06F 9/5077 710/22 |
| 2010/0257263 A1* | 10/2010 | Casado | H04L 49/25 718/1 |
| 2013/0060940 A1* | 3/2013 | Koponen | H04L 45/76 709/225 |
| 2013/0067467 A1* | 3/2013 | Aslot | G06F 11/0712 718/1 |
| 2013/0132162 A1* | 5/2013 | Banerjee | G06Q 10/0637 705/7.36 |
| 2013/0173859 A1* | 7/2013 | Gorrell | G06F 3/0686 711/112 |
| 2015/0067065 A1* | 3/2015 | Dolph | H04L 51/58 709/206 |
| 2015/0193251 A1* | 7/2015 | Chu | G06F 1/3246 718/1 |
| 2015/0317173 A1* | 11/2015 | Anglin | G06F 9/5088 718/1 |
| 2016/0077965 A1* | 3/2016 | Gaonkar | G06F 12/0284 711/153 |
| 2016/0366252 A1* | 12/2016 | Chefalas | H04L 67/10 |
| 2017/0046185 A1* | 2/2017 | Tsirkin | G06F 12/1009 |
| 2017/0046186 A1* | 2/2017 | Tsirkin | G06F 9/45533 |
| 2017/0061138 A1* | 3/2017 | Lambert | H04L 63/18 |
| 2017/0063989 A1* | 3/2017 | Langouev | G06F 9/5083 |
| 2017/0097841 A1* | 4/2017 | Chang | H04L 12/4633 |
| 2017/0244593 A1* | 8/2017 | Rangasamy | H04L 61/3015 |
| 2018/0139280 A1* | 5/2018 | Zhang | G06F 3/0619 |
| 2018/0260241 A1* | 9/2018 | Khurange | G06F 9/44568 |
| 2018/0293140 A1* | 10/2018 | Arroyo | G06F 11/1451 |
| 2018/0331973 A1* | 11/2018 | Mani | G06F 8/65 |
| 2019/0188386 A1* | 6/2019 | Pogorelik | G06F 21/79 |
| 2019/0253274 A1* | 8/2019 | Van Dussen | H04L 12/4641 |
| 2019/0286359 A1* | 9/2019 | Patel | G06F 3/067 |
| 2019/0362319 A1* | 11/2019 | Yen | G06Q 10/1097 |
| 2020/0100269 A1* | 3/2020 | Gulbay | H04W 72/048 |
| 2020/0137688 A1* | 4/2020 | Gulbay | H04W 52/0235 |
| 2021/0064536 A1* | 3/2021 | Palmer | G06F 12/0891 |
| 2021/0306416 A1* | 9/2021 | Mukhopadhyay | H04L 67/1095 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

IBM, "z/ Architecture—Principles of Operation," IBM Publication No. SA22-7832-12, Thirteenth Edition, Sep. 2019, pp. 1-2000.

* cited by examiner

TRANSFERRING AN OPERATING IMAGE INTO A MULTI-TENANT ENVIRONMENT

BACKGROUND

One or more aspects of the invention relate generally to disaster recovery of a computer system, and more specifically, to transferring a partition function from a source system to a multi-tenant target environment.

The more the world is developing into a completely digitized environment, the more an "always-on" IT (information technology) infrastructure becomes paramount for continued success. Although cloud computing approaches lead the way into the future, there is still a high number of enterprises with on-premise computing environments. Typically, the higher the requirements for security and data protection, the higher the probability that the respective enterprise deploys its IT resources on its own premise.

For such environments, disaster recovery policies and workflows are typically in place. Some require a lot of time until a failed computer system can be brought back online; in other cases, it may be quite costly to always keep a completely configured backup system available. However, for some industries, governmental regulations may mandate that only a limited amount of downtime is acceptable.

SUMMARY

Shortcomings of the prior art are overcome, and additional advantages are provided through the provision of a computer-implemented method of transferring a partition function. The computer-implemented method includes separating physical and logical I/O configuration settings of a partition image on a source system. Logical I/O configuration settings are moved from the source system to a remote multi-tenant target environment. The remote multi-tenant target environment includes a plurality of target systems, and a dedicated target system of the remote multi-tenant target environment is selected. Physical information about hardware and connections of the dedicated target system are added to the logical I/O configuration settings. The logical I/O configuration settings are activated combined with the physical information in the dedicated target system. An operating system is started with the activated logical I/O configuration settings, such that the partition function is transferred.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects defined above, and further aspects of the present invention, are apparent from the examples of embodiments to be described hereinafter and are explained with reference to the examples of embodiments, but to which aspects of the invention are not limited.

Embodiments of aspects of the invention are described, by way of example only, and with reference to the following drawings.

DETAILED DESCRIPTION

Figure 1:
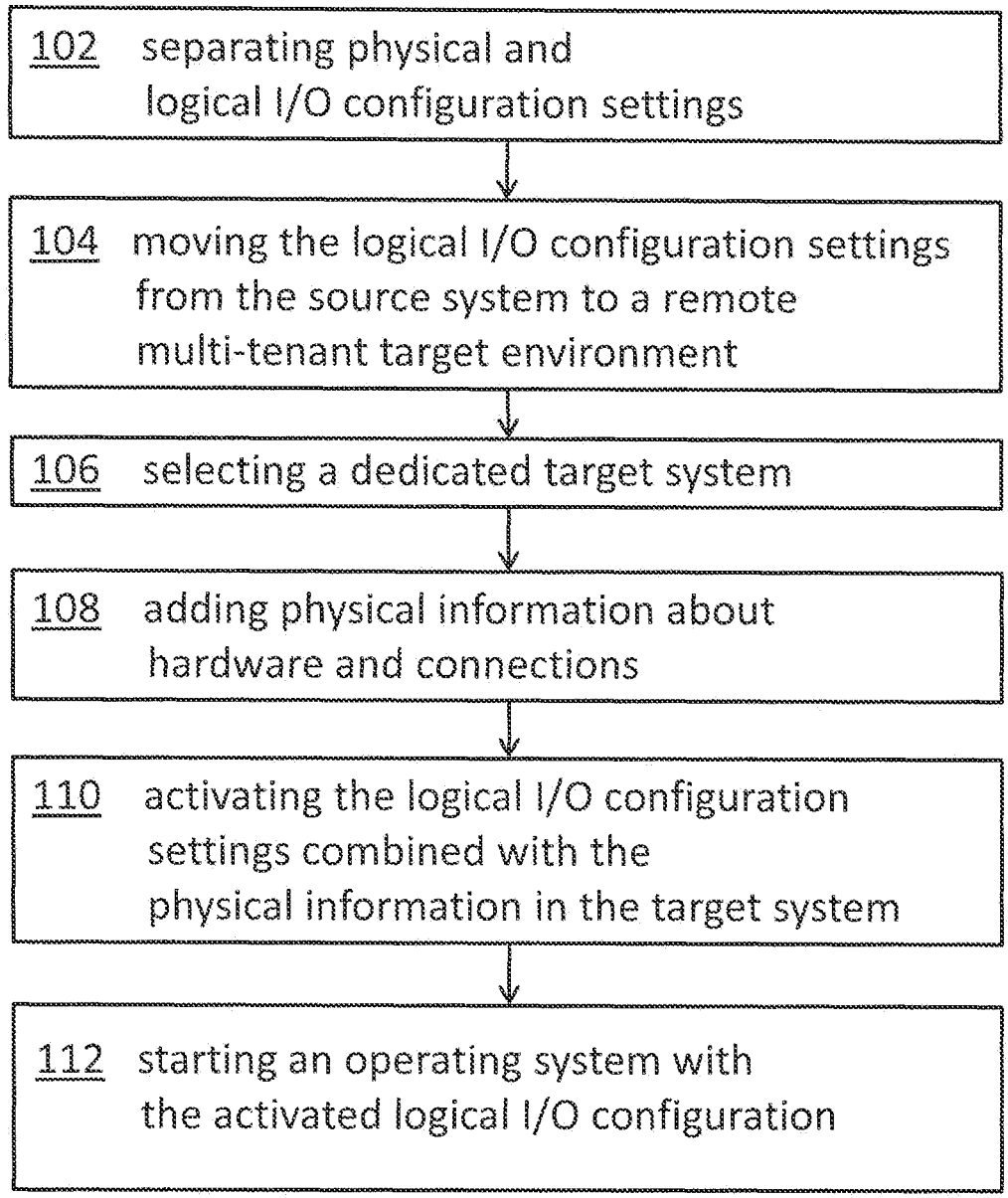
FIG. 1 shows one example of a block diagram of an embodiment of transferring a partition function from a source system to a multi-tenant target environment, in accordance with one or more aspects of the present invention.

In the context of this description, the following conventions, terms and/or expressions may be used:

The term 'partition function' denotes, in one or more embodiments, the external visible behavior of a partition including its respective operating system within a selected architecture-based computer system, e.g., a z/Architecture®-based computer system offered by International Business Machines Corporation, Armonk, N.Y., or other architecture-based computer systems offered by International Business Machines Corporation or other companies. Z/ARCHITECTURE is a registered trademark of International Business Machines Corporation in at least one jurisdiction. The concept of partitions or logical partitions (LPAR) is well understood in the context of mainframe computers, like those based on the z/Architecture hardware architecture, which has its origins in the System/360 and System/370 computer systems from International Business Machines Corporation, Armonk, N.Y. Logical partitions may be compared to a sort of virtual machines in other operating systems with known and well understood differences. If used together with a hypervisor, a virtual machine may be transferred from one physical machine to another one. In this case, the complete binary file of the virtual machine may be moved and transferred to another computing environment. In contrast to this, the movement of the function of a partition—i.e., partition function—does not necessarily transfer the complete binary image of the partition including its operating system but only, transfers the mapping to physical devices, cabling, and so on. Thus, the function of the original partition may be restorable even without the binary image of the original logical partition.

The term 'source system' denotes, in one or more embodiments, a computing system or computing environment from which the partition function is transferred.

The term 'multi-tenant target environment' denotes, in one or more embodiments, a data center comprising a plurality of computing system storage systems and so on which may be used by multiple legal entities, i.e., different enterprises.

The term 'physical and logical I/O configuration settings' denotes, in one or more embodiments, e.g., virtual addresses of devices, as well as actual, physical addresses of devices like storage devices, communication devices, etc.

The term 'partition image' denotes, in one or more embodiments, a binary file comprising the complete current bit setting of a partition or logical partition in the above defined sense.

The term 'remote' denotes, in one or more embodiments, that something is located at a different physical location. As an example, the data center of an enterprise may be in one physical location, while a remote multi-tenant computing center may be located in a second physical location that is a certain distance from the first physical location.

The term 'target system' denotes, in one or more embodiments, a computing system—in particular based on a selected hardware architecture, such as the z/Architecture hardware architecture—to which the partition function shall be transferred.

The term 'dedicated target system' denotes, in one or more embodiments, a computing system which may or may not be shared with users of a different enterprise. In the multi-user computing environment—e.g., cloud computing environment—both options are possible.

The term 'physical information' denotes, in one or more embodiments, data and configuration data about physical devices, e.g., storage devices.

The term 'Z-based operating system' denotes, in one or more embodiments, an operating system for a computer based on the z/Architecture hardware architecture. Examples of such hardware architecture are mainframe computers and compatible ones offered by International Business Machines Corporation, Armonk, N.Y. For computer systems of such an architecture, a plurality of different operating systems is available, like a z/OS® operating system, a z/VSE® operating system, a z/VM® operating system or a Linux operating system on a system based on the z/Architecture hardware architecture (i.e., Linux on an IBM Z® system). z/OS, z/VSE, z/VM and IBM Z are trademarks or registered trademarks of International Business Machines Corporation in at least one jurisdiction. The registered trademark Linux® is used pursuant to a sublicense from the Linux Foundation, the exclusive licensee of Linus Torvalds, owner of the mark on a worldwide basis.

The term 'physical Z architecture' (or z/Architecture) denotes, in or more embodiments, a hardware computing system fundamental operations concept (i.e., POP—principle of operation) using a 64-bit instruction set architecture of International Business Machines Corporation, which is backwards compatible to the before used 32-bit data/31 bit addressing architecture.

The term 'placement policy file' denotes, in one or more embodiments, a digitally and/or machine-readable document including information about where and how an operating system and/or a partition shall be installed. Options may include a dedicated hardware system, a shared hardware system and/or dedicated or shared I/O devices. The placement policy file may be a technical logical translation of a portion of a service contract.

The term 'shared channel subsystem' denotes, in one or more embodiments, a channel subsystem which may be shared between different users/different enterprises. In the z/Architecture hardware architecture, I/O devices are typically connected via physical and or logical channels, i.e., communication channels which may be implemented using dedicated cabling and adapters.

The term 'application data' denotes, in one or more embodiments, data belonging to an application which may be supported by an operating system. However, application data may also be data describing individual configurations of a partition and/or an operating system.

The term 'cloud computing' may in this context be interpreted as a model for enabling convenient, on-demand network access to a shared pool of configurable computing resources (e.g., networks, servers, storage, applications, and services) that can be rapidly provisioned and released with minimal management effort or service provider interaction. The remote multi-tenant computing environment is implemented, in one or more embodiments, as a cloud computing data center. It may be noted that cloud software takes full advantage of the cloud paradigm by being service-oriented with a focus on statelessness (with exceptions), low coupling, modularity, and semantic interoperability. Aspects of cloud computing are described further below.

FIG. 1 shows one example of a block diagram of one embodiment of a computer-implemented method 100 for transferring a partition function from a source system to a multi-tenant target environment. The source system may be a traditional computing system operated on the premises of an enterprise in a dedicated IT center; and in contrast, the multi-tenant target environment may include a plurality of computing systems of different generations and also different architectures. The method 100 includes, for instance, separating, 102, physical, i.e., real, and logical I/O configuration settings of a partition image in the source system. This may be reflected in a subset of the input/output definition file (IODF), namely the logical settings, e.g., device numbers, and so on.

The method 100 includes moving, 104, the logical I/O configuration settings—e.g., stored in a configuration database (e.g., CMDB) or alternatively, as a flat file—from the source system to a remote multi-tenant target environment including a plurality of target systems. The target systems may have a different architecture and/or may belong to a different generation of the computer system types of the source system.

Furthermore, the method 100 includes selecting, 106, a dedicated target system from within the multi-tenant target environment and, adding, 108, physical information about hardware and connections of the dedicated target system to the logical I/O configuration settings. Such a mapping can also be based on dedicated policies and/or on the type of operating system that is to be transferred.

Additionally, the method 100 includes activating, 110, the logical I/O configuration settings combined with the physical information in the target system, and starting, 112, an operating system with the activated logical I/O configuration so that the partition function is transferred. In one embodiment, the operating system can be transferred together with the application data from the source system to the target system. Thus, the original operation license may be used. Alternatively, another binary copy of the operating system or a compatible operating system may be loaded and started from a storage device of the remote multi-tenant computing environment. This may reduce the transfer time but may require another license.

Figure 2:
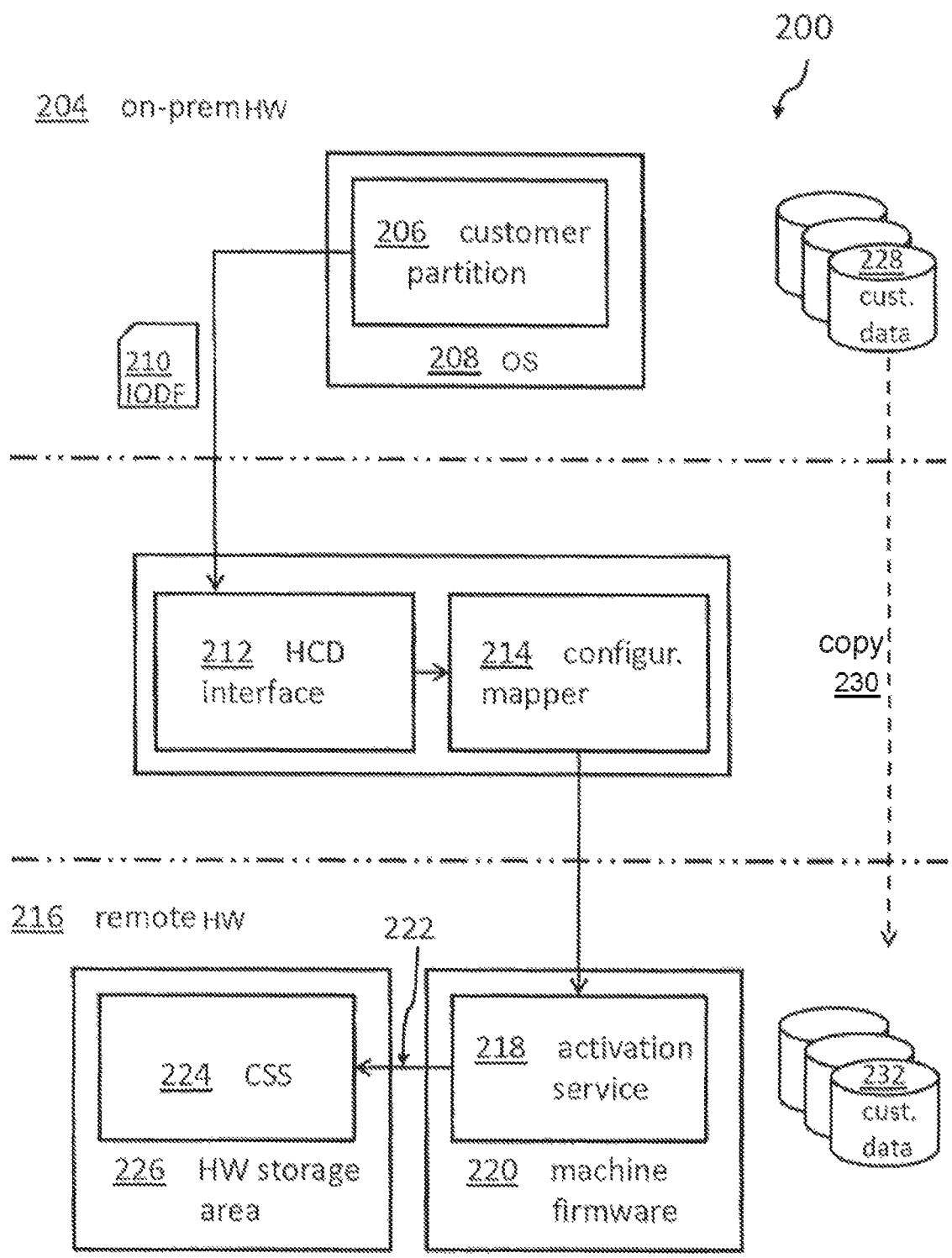
FIG. 2 shows one example of a block diagram of an embodiment of an architecture of one or more aspects of the present invention.

FIG. 2 shows one example of a block diagram of an embodiment of an architecture 200 of one or more aspects of the present invention. One or more aspects of the present invention are demonstrated in more detail, namely the separation of the physical, e.g., physical adapter cards, and logical I/O configuration information, e.g., partition configuration and its connected devices identified by their device number. After that the logical I/O configuration from a dedicated on-premise (or at customer site) installation to a shared multi-tenant computing environment, e.g., a cloud computing data center in which physical information about the new hardware and the cabling is automatically added to the configuration and where the logical I/O configuration is mapped to the new physical adapters and to cabling. The combined logical and physical configuration in the new computing environment is activated, in which the configuration describes the computing environment shared by multiple tenants and on the partitions so that each customer partition is running without a change to the logical I/O configuration if compared to the original on-premise installation.

For this purpose, FIG. 2 symbolically shows the on-premise installation in the upper third of the figure, in particular a selected architecture system 204, such as a z/Architecture system or another architecture system of International Business Machines Corporation or other companies. A customer partition 206 runs, e.g., in a selected operating system environment 208, such as a z/OS operating system environment or another operating system environment offered by International Business Machines Corporation or other companies. An I/O definition file (IODF) 210 can be accessed with the tool for editing the configuration settings, namely the hardware configuration definition interface (e.g., HCD, which is typically a panel driven interface). A connected configuration mapper 214 can extract the information available in the IODF and move it to the remote multi-tenant computing environment, namely a remote hardware computing system of a selected hardware architecture 216, such as a remote hardware computing system based on the z/Architecture hardware architecture, or another computing system based on another hardware architecture of International Business Machines Corporation or other companies.

An activation service 218 receives the information from configuration mapper 214. Activation service 218 may be executed as part of machine firmware 220 or any other suitable computing environment, e.g., as part of the remote target environment. Via a channel subsystem call (CHSC) 222, a channel subsystem (CSS) 224 managing storage hardware 226 is instructed and configured. In parallel, as an example, customer data 228 can be copied, 230, to customer data 232 in the target remote multi-tenant computing environment in which the remote hardware computing system of a selected hardware architecture 216 is physically located. It is also possible to copy the binary file of the original operating system executed on the on-premise remote hardware (HW) 204 to the target environment. Alternatively, another copy of the operating system that is available in the remote multi-tenant computing environment may be used and activated with the information from the new computing environment.

Figure 3:
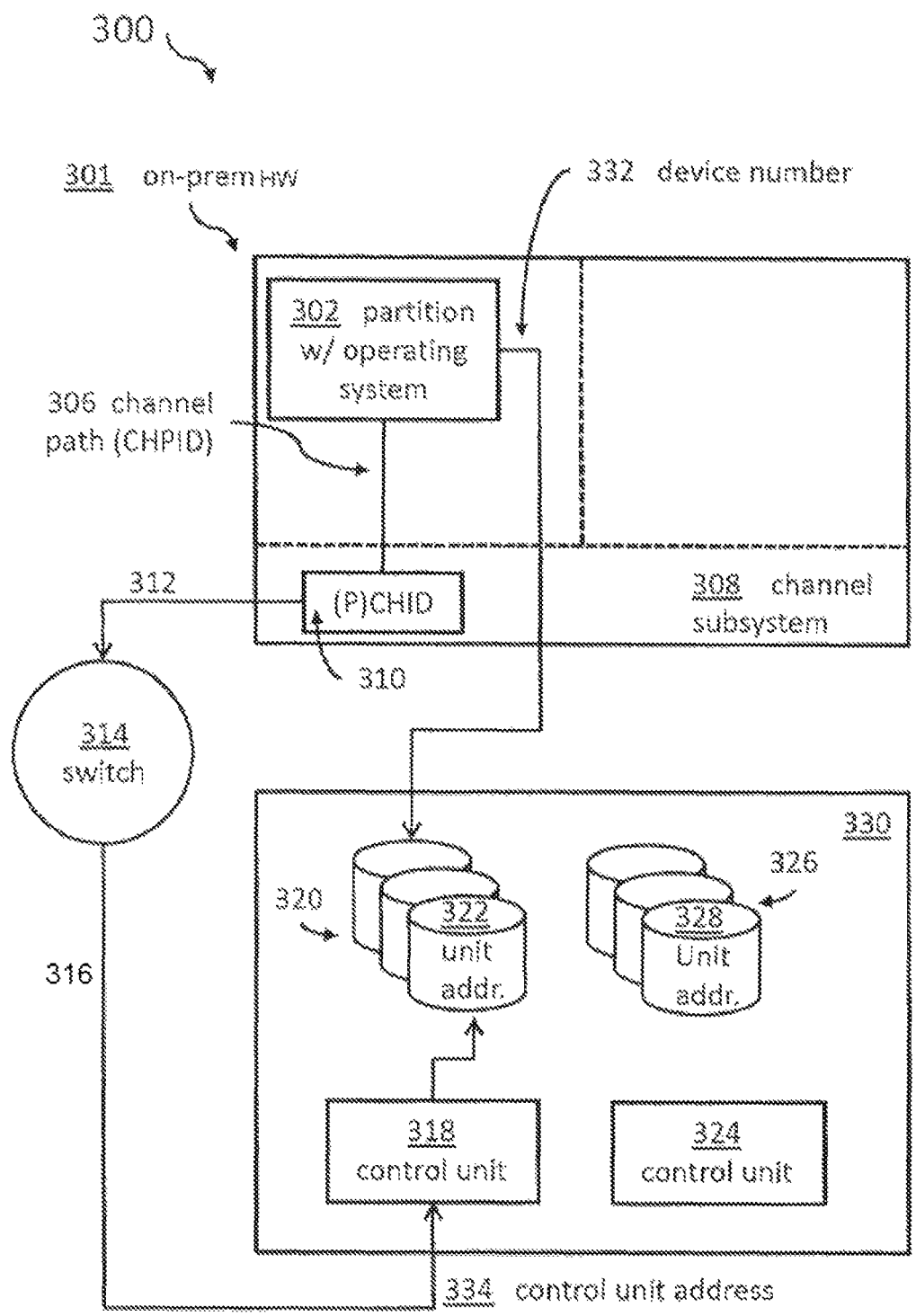
FIG. 3 shows one example of a block diagram illustrating configurations and settings of a partition before and after the transfer, in particular which stay unchanged and which are changed automatically, in accordance with one or more aspects of the present invention.

FIG. 3 shows one example of a block diagram 300 illustrating configurations and settings of a partition before and after the transfer, in particular, which stay unchanged and which are changed automatically. In an upper portion of FIG. 3, the on-premise hardware (HW) system 301 (e.g., z/Architecture-based hardware system or another architecture-based hardware system) is shown symbolically (compare 204 in FIG. 2). A partition 302 with a respective operating system is executed, which has—via a channel path (CHPID, channel path identifier)—306 access to a channel subsystem 308. Here, the (physical) channel resolution occurs in the form of the (physical) channel identifier 310.

This information is used together with an entry switch ID and port number (compare reference numeral 312) for switch 314 which, in turn, uses the connected switch and port link address (compare reference numeral 316) as entry (and, e.g., selection criteria) for the respective control unit 318—using a control unit address 334—in order to address devices 320 via dedicated unit addresses 322. Typically, a plurality of control units 324 for controlling devices 326 with unit addresses 328 is available in the remote multi-tenant computing environment. The latter-mentioned units are typically part of a storage server 330.

In such a usual set-up, partition 302 with the operating system can access the devices 320 via device numbers 332. After movement of the partition function, according to one or more aspects of the present invention, a partition running now in the remote multi-tenant computing environment does not see any changes in the (logical) device numbers 332 used to address specific devices 320. Hence, from a partition with the respective operating system partition perspective the environment has not changed even if the new partition is now running in the remote multi-tenant computing environment.

This can work because potential collisions with already defined partitions are avoided by one or more aspects of the present invention. Namely, the following collisions can be avoided: partition names, image IDs (identifiers), channel paths (CHPIDs, PCHIDs) control unit numbers, switch ports, unit addresses/control unit addresses. One or more aspects work if a different type of hardware, e.g., from a different generation but generally compatible, is used in the remote multi-tenant computing environment. All of this may be performed without any human intervention in a fully automatic way.

Figure 4:
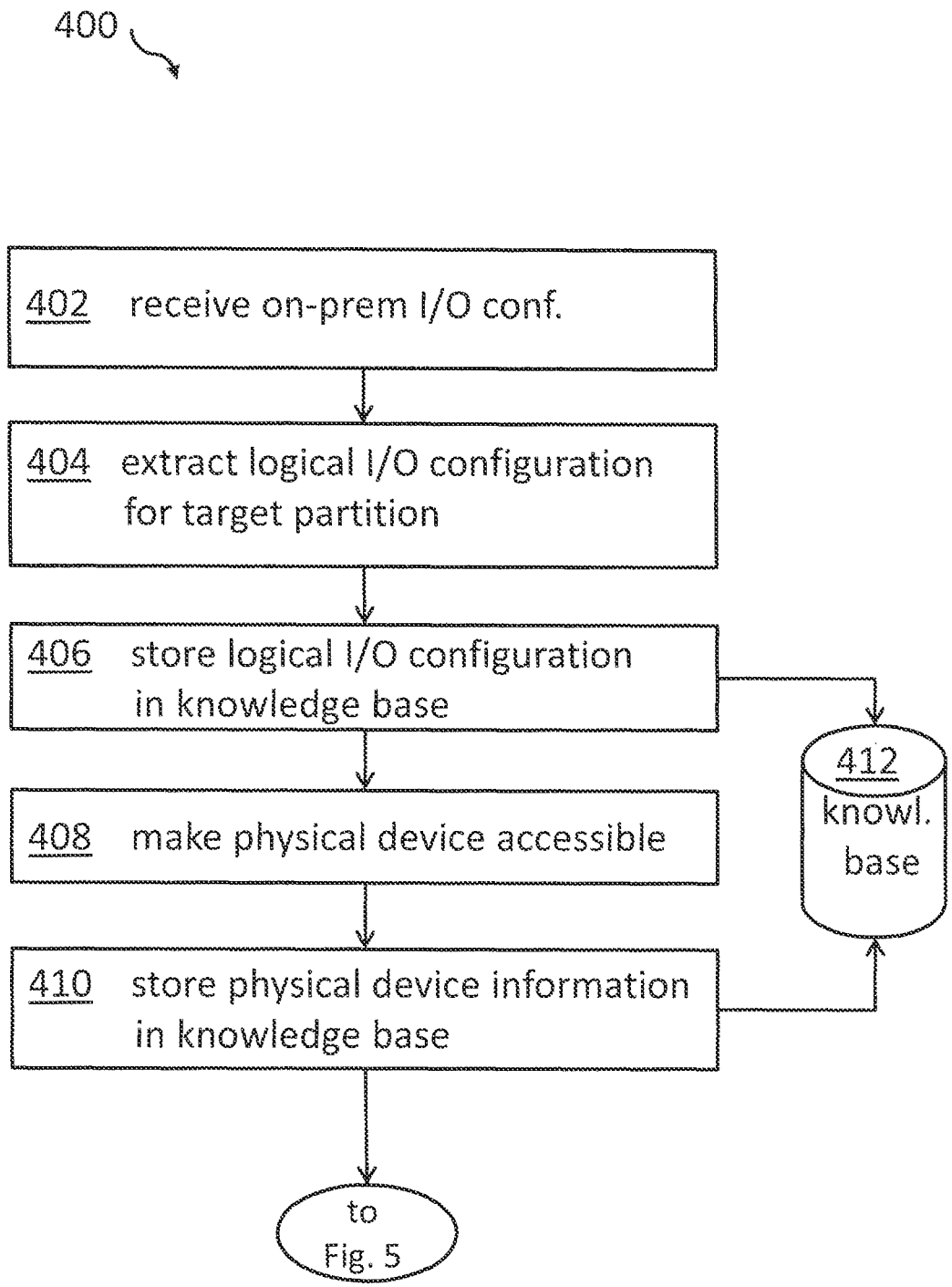
FIG. 4 shows one example of a first portion of a flowchart of an embodiment, in accordance with one or more aspects of the present invention.

FIG. 4 shows one example of a first portion 400 of a flowchart of an embodiment of one or more aspects of the present invention. After a start of the migration process, the system receives, 402, the on-premise I/O configuration. The logical I/O configuration for the target partitions 404 is extracted from this. In a next step, the logical I/O configuration is stored, 406, in a respective knowledge database 412, as an example. Then, the physical devices are made available, 408. Based on this, the physical device information is stored, 410, in the knowledge base 412, as one example. A continuation of this flowchart is shown in the next figure.

Figure 5:
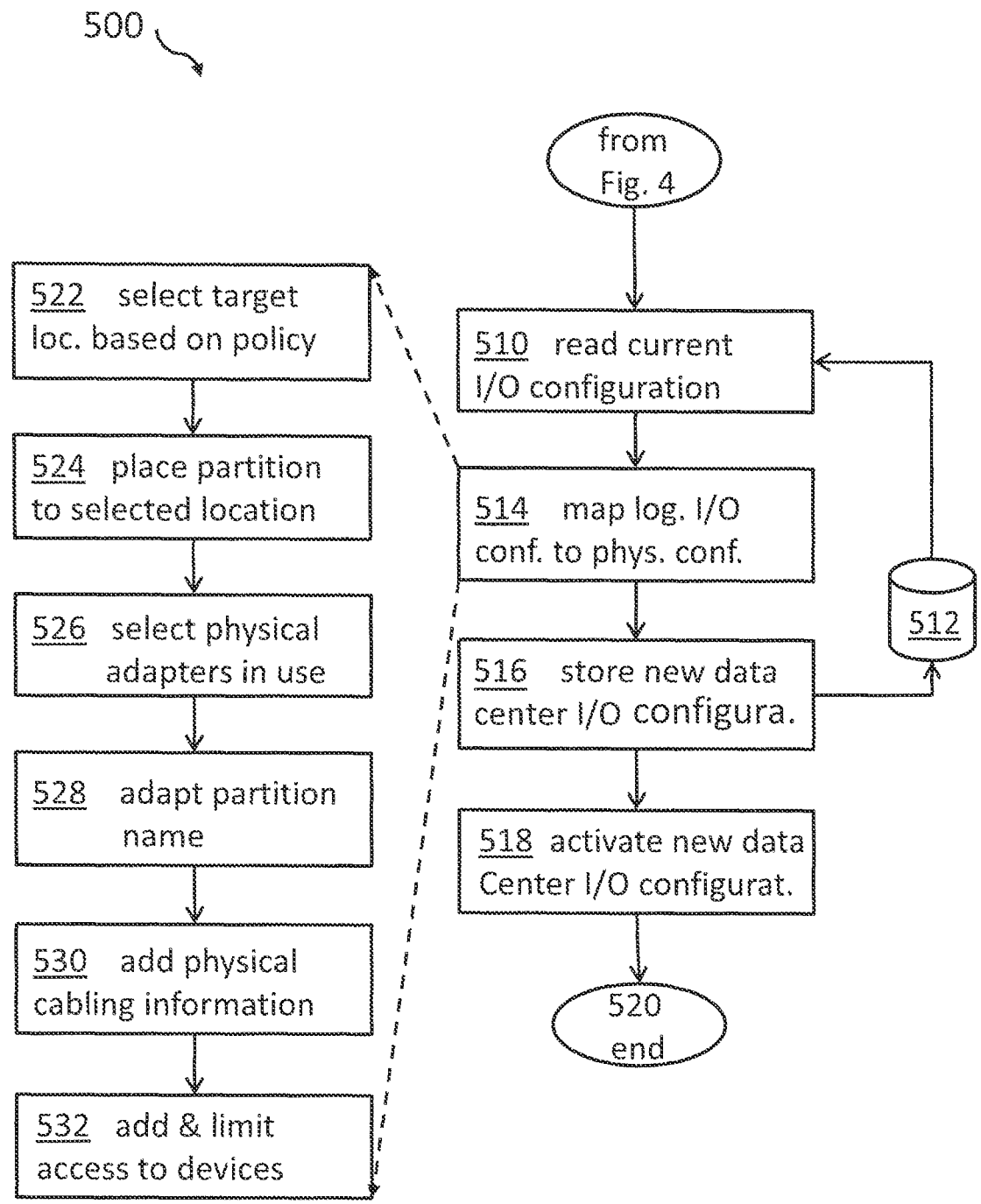
FIG. 5 shows one example of a second portion of a flowchart of an embodiment, in accordance with one or more aspects of the present invention.

FIG. 5 shows one example of a second portion 500 of a flowchart of an embodiment of one or more aspects of the present invention. In this portion of the overall flowchart, the process continues with a reading 510 of the current I/O configuration. This is read from the data center specific configuration database 512. Then, the logical I/O configuration is mapped, 514, to the physical configuration. This process portion is detailed in the block diagram on the left side of FIG. 5 (see below).

Next, the new data center I/O configuration is stored, 516, in the data standard I/O configuration database 512. Then the new data center I/O configuration is activated 518, such that a new partition with a new operating system (e.g., z/Architecture hardware-based operating system or another selected architecture-based operating system of International Business Machines Corporation or other companies) can be started and executed. The process ends at 520.

As details of the step of mapping the logical I/O configuration to the physical I/O configuration (refer to reference numeral 514), the following individual steps can be executed, in one example: select a target location in the remote multi-tenant computing environment based on a policy file (522), place the partition at the selected location (524), select physical adapters to be used (526), adapt the partition name (528), add the physical cabling information (530) and, add and limit the access to customer devices, e.g. from other users/customers (532).

Figure 6:
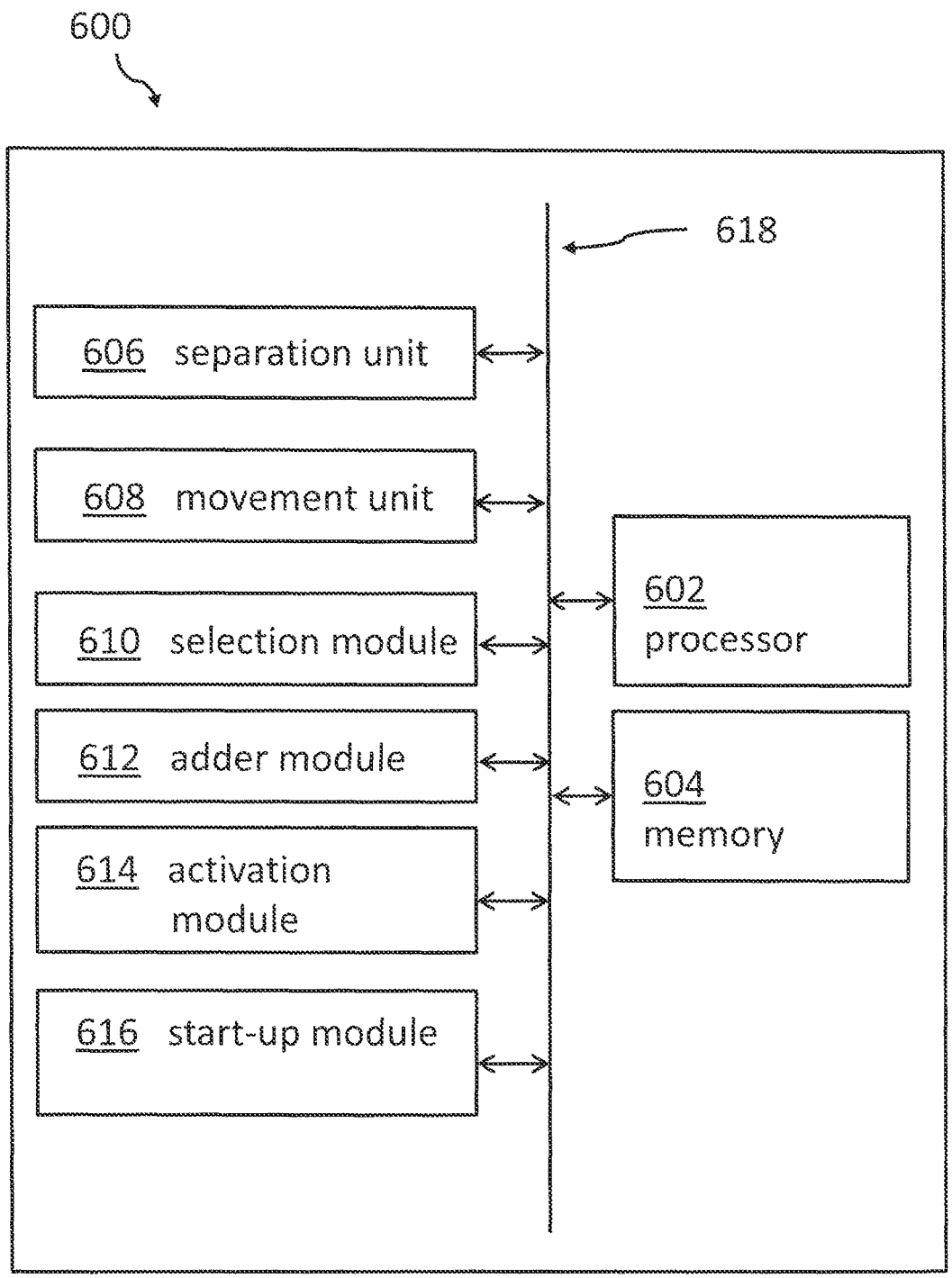
FIG. 6 shows one example of a block diagram of an embodiment of a partition function transfer system, in accordance with one or more aspects of the present invention.

FIG. 6 shows one example of a block diagram of an embodiment of a partition function transfer system 600 for transferring a partition function from a source system to a multi-tenant target environment. Partition function transfer system 600 includes a processor 602 and a memory 604 operatively coupled to processor 602, wherein memory 604 stores program code portions (not shown), which, if executed, enable processor 602 to perform the following, for instance: separate—e.g., in particular by a separation unit 606—physical and logical I/O configuration settings of a partition image on the source system, move—e.g., in particular by a movement unit 608—the logical I/O configuration settings from the source system to a remote multi-tenant target environment comprising a plurality of target systems and, select—e.g., in particular by a selection module 610—a dedicated target system from within the multi-tenant target environment.

Additionally, memory 604 stores also program code portions, which, if executed, enable processor 602 to perform the following, in one or more aspects: add—e.g., in particular by adder module 612—physical information about hardware and connections of the dedicated target system to the logical I/O configuration settings, activate—in particular by activation module 614—the logical I/O configuration settings combined with the physical information in the target system, and start—e.g., in particular, using a startup module 616—the operating system.

It shall also be mentioned, that the functions, performed by processor 602 using program code portions can also be implemented completely in the hardware. For that, the different modules, units and other functional blocks are electrically connected for signal and data exchange. This applies in particular to processor 602, memory 604, separation unit 606, movement unit 608, selection module 610, adder module 612, activation module 614, and startup module 616. Instead of a direct 1:1 interconnect concept between the units and modules, they may also be connected to one another for data and signal exchange via a system internal bus system 618.

In one or more aspects, the remote multi-user computing environment in which one or more aspects of the invention may be deployed is a cloud computing environment. Thus, one or more aspect relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
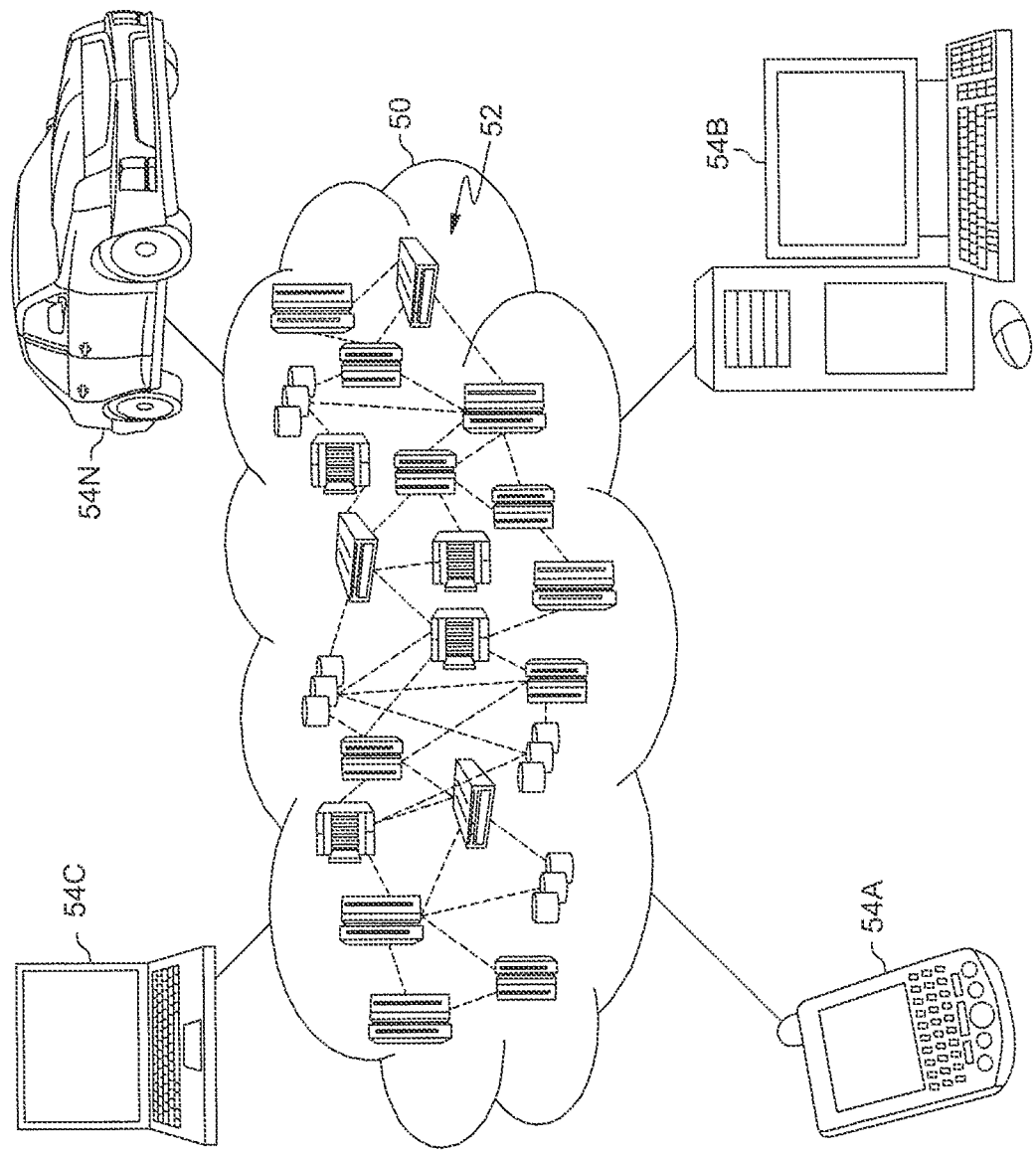
FIG. 7 depicts one embodiment of a cloud computing environment, in accordance with one or more aspects of the present invention.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
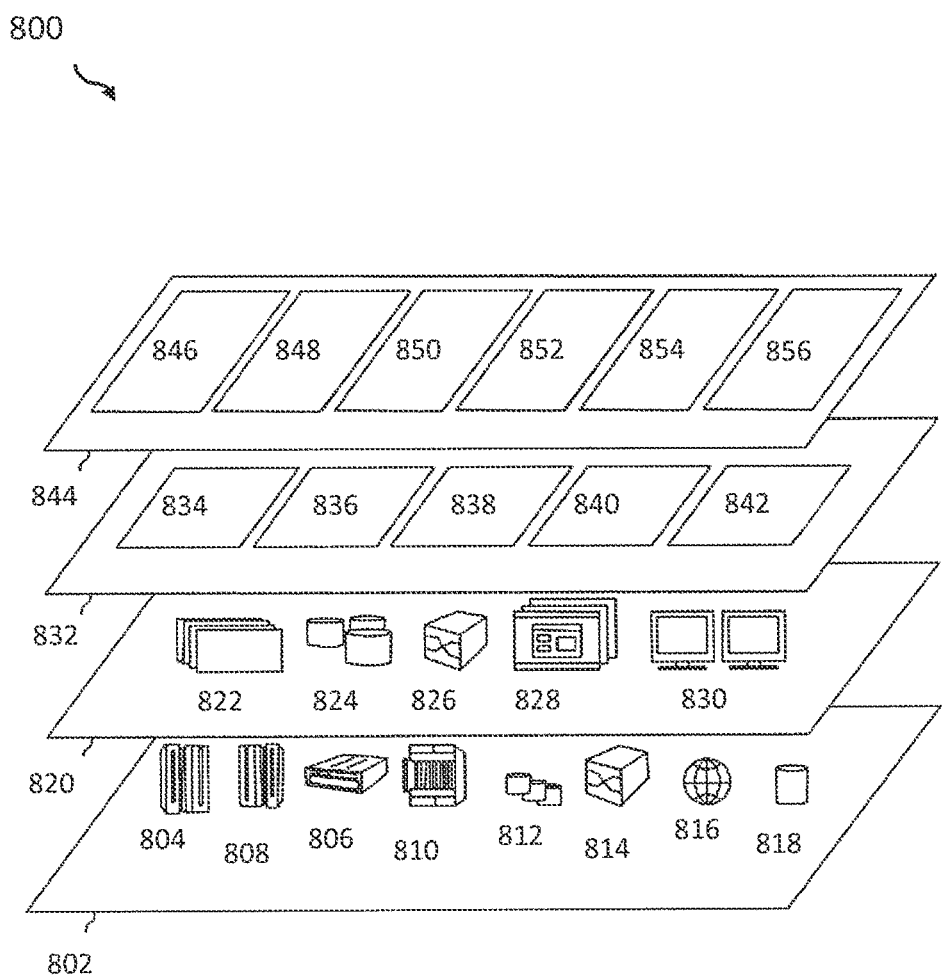
FIG. 8 depicts one example of abstraction model layers, in accordance with one or more aspects of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 802 includes hardware and software components. Examples of hardware components include: mainframes 804; RISC (Reduced Instruction Set Computer) architecture based servers 808; servers 806; blade servers 810; storage devices 812; and networks and networking components 814. In some embodiments, software components include network application server software 816 and database software 818.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830.

In one example, management layer 832 may provide the functions described below. Resource provisioning 834 provides dynamic procurement of computing resources and other resources that are utilized to perform tasks within the cloud computing environment. Metering and Pricing 836 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 838 provides access to the cloud computing environment for consumers and system administrators. Service level management 840 provides cloud computing resource allocation and management such that required service levels are met. Service Level Agreement (SLA) planning and fulfillment 842 provide pre-arrangement for, and procurement of, cloud computing resources for which a future requirement is anticipated in accordance with an SLA.

Workloads layer 844 provides examples of functionality for which the cloud computing environment may be utilized. Examples of workloads and functions which may be provided from this layer include: mapping and navigation 846; software development and lifecycle management 848; virtual classroom education delivery 850; data analytics processing 852; transaction processing 854; and partition function transfer processing 856.

As described herein, according to one or more aspects of the present invention, a computer-implemented method for transferring a partition function from a source system to a multi-tenant target environment is provided. As an example, the method includes separating physical and logical I/O configuration settings of a partition image on the source system, moving the logical I/O configuration settings from the source system to a remote multi-tenant target environment including a plurality of target systems and, selecting a dedicated target system from within the multi-tenant target environment. Further, in one embodiment, the method includes adding physical information about hardware and connections of the dedicated target system to the logical I/O configuration settings, activating the logical I/O configuration settings combined with the physical information in the target system, and starting an operating system with the activated logical I/O configuration so that the partition function is transferred.

According to another aspect of the present invention, a partition function transfer system for transferring a partition function from a source system to a multi-tenant target environment is provided. The partition function transfer system includes, for instance, a processor and a memory operatively coupled to the processor, wherein the memory stores program code portions, which, if executed, enable the processor to: separate physical and logical I/O configuration settings of a partition image on the source system, move the logical I/O configuration settings from the source system to a remote multi-tenant target environment comprising a plurality of target systems, select a dedicated target system from within the multi-tenant target environment, add physical information about hardware and connections of the dedicated target system to the logical I/O configuration settings, activate the logical I/O configuration settings combined with the physical information in the target system, and start an operating system with the activated logical I/O configuration so that the partition function is transferred.

One or more aspects of the invention that transfer a partition function from a source system to a multi-tenant target environment may offer advantages, technical effects, contributions and/or improvements. However, one or more embodiments of the invention may not have the potential advantages and the potential advantages are not necessarily required for all embodiments.

One or more aspects provide a technical basis of moving a partition function, typically used on mainframe computers, e.g., z/Architecture-based architecture systems, from an on-premise computing environment to a remote multi-tenant target computing environment, e.g., a cloud computing data center. This enables a system recovery or disaster recovery after a system failure in case of other problems in an on-premise computing system for which no local standby system is available. This may significantly reduce costs and operating manpower, as an online or hot-standby system may require cooling or other resources for a constantly available online replacement system.

In one or more aspects, a highly automated and automatic migration of a partition or partition function from a private computing environment of an enterprise to a remote target data center shared by one or more enterprises concept are made available. Only a limited number of additional functions may be used to realize this way to keep computing resources also available in case of a failure of an on-premise computing system using an aspect of partitioning of the computing system and/or the operating system.

Placement policy restrictions as well as settings for adapter sharing and a defined configuration topology can be reflected automatically, so that the transfer of the present partition function may be executed without any human intervention. This may allow a comparably quick rebound of computing functions to end-users. It may also allow reduction of capital spending because no standby system may be required for contingency reasons and it may not be kept up-to-date with operator resources.

One or more aspects are applicable to z/Architecture-based computing environments, as well as other computer platforms and computer systems of International Business Machines Corporation and/or other companies allowing the concept of partitioning. This may also include a possible adaptation of the connection or connecting infrastructure from the partition to I/O devices. For example, a directly attached storage server on-premise may be changed to a switched connection in the multi-tenant computing environment. Another way for adapting the connections may be by changing the number of paths, e.g., from 4 on-premise to 8 in the multi-tenant computing environment. There may also be an option of exchanging connection adapter types. For example, a coupling connection using an older adapter type may be replaced using a newer adapter type to couple channels. Further, the hardware generation may be changed. For example, the partition may be moved from an IBM z13® on-premise to an IBM z15™ in the cloud. z13 and z15 are trademarks or registered trademarks of International Business Machines Corporation in at least one jurisdiction.

Furthermore, the logical movement of the partition may improve the resiliency and/or fault-tolerance since the connections in the target environment may be more resilient and/or fault-tolerant than those of the source system.

According to one embodiment of the method, the partition function may be represented by a Z-based operating system (or other operating system) together with the logical I/O configuration settings, and the dedicated target computing system may be a physical Z architecture system (or other system). In one or more aspects, mainframe computing systems, which are able to implement the function of partitioning, may transfer specific partition functions to a remote target system without the requirement of human invention and without the need of managing such a transfer based on a panel-driven user interface for an operator, e.g., HCD (hardware configuration definition). Hardware configuration definition is offered by International Business Machines Corporation and used in products to define and activate I/O configurations of, for instance, z/Architecture-based servers and its operating systems.

According to a further embodiment, the Z-based operating system may be one selected out of a group consisting of a z/OS operating system, a z/VSE operating system, a z/VM operating system and a Linux operating system, in particular, Linux on an IBM Z system. Hence, operating systems that are based on, for instance, z/Architecture-based computing architectures may be supported with one or more aspects of the present invention. This may apply to proprietary operating systems, as well as to open-source operating systems, such as Linux.

In further embodiments, other computing architectures and/or other operating systems of International Business Machines Corporation and/or other companies may be configured to include and/or use one or more aspects of the present invention.

According to an embodiment, the source system and the dedicated target system may be computing systems of different hardware generations. Because the source system—typically an on-premise computing system—and the target computing system—typically being operated as part of a cloud computing environment—are geographically distant to each other, the probability that the source and target system are not from the same hardware generation may increase. Additionally, this feature may enable a much higher flexibility because it is not a strict requirement that the target system and the source system be identical as is the case today in many classical disaster recovery plans.

According to one embodiment, different partition functions on the target system may be strictly isolated against each other. This feature may be used for highly secure computing environments in multi-user environments so that no cross-tenant or cross-customer resource and data accesses are possible. With this concept, an Enterprise Assurance Level (EAL) 5+ can be realized. EAL5+ is one of the highest security levels achievable and the highest achievable for mobile systems. EAL of an IT product or system is the known numerical grade assigned to follow the completion of a Common Criteria security evaluation which is as an international standard in effect since 1999.

According to another embodiment, an I/O definition file—e.g., an IODF in a z/Architecture-based architecture context—of the source system is read for the separation of physical and logical I/O configuration settings for a partition image. A configuration mapper may carry out this function.

According to one embodiment, a placement policy file is read for the selection of a dedicated target system. The placement policy file includes, in one example, runtime definition data selected out of a group consisting of isolated hardware, a dedicated channel subsystem—e.g., CSS—and, a partition for a shared channel subsystem. The placement policy file is available, in one example, with a reference to the target system, e.g., to the owner organization of the target system. It may represent the technical conditions for a transfer of a partition function into a remote multi-tenant computing environment. Basically, the placement policy file may include the options for sharing resources and thus may relate to security policies to be implemented on the target system.

According to another embodiment, the placement policy file may include adapter definition data selected out of a group consisting of shared adapters and dedicated adapters. This may assume that the selected adapters and/or adapter types are available on the target system. Also this feature may be a reflection of security requirements and policies. For example, a highly secure system may not allow shared adapters for the different tenants because they may insist on dedicated adapters that may not be compromised.

According to one embodiment, the movement of the logical I/O configuration settings from the source system to a remote multi-tenant target environment may also include moving application data from the source system to the remote multi-tenant target environment. The application data may be applications viewed from an operating system perspective, e.g., network applications, systems management applications, data storage applications, etc., as well as end user oriented applications, such as transactional applications and those comprising end user interfaces. However, also binary data of the operating system used on the source system may be moved, i.e., transferred, to the target system. This feature would provide the option that a user organization may operate its transferred partition function under the same license. Alternatively, an operating system binary file can also be used and started on the target system, which is compatible with the operating system of the source system, but which is stored in the remote environment with several clients.

According to one embodiment, the activation of the logical I/O configuration settings may use configuration data comprising at least one selected out of a group consisting of a target location for the partition image, one or more adapters required, physical cabling information, and access control information to application functions and data. Hence, the complete set of configuration and boot data for the operating system to make the partition function available may be used in order to reconstruct the complete original partition function context. Also, in such an environment, the transferred binary application files may be started without any reconfiguration or other manual interventions. Hence, a quick, clean and highly automated partition function transfer to a remote multi-tenant computing system environment may be achievable.

Figure 9:
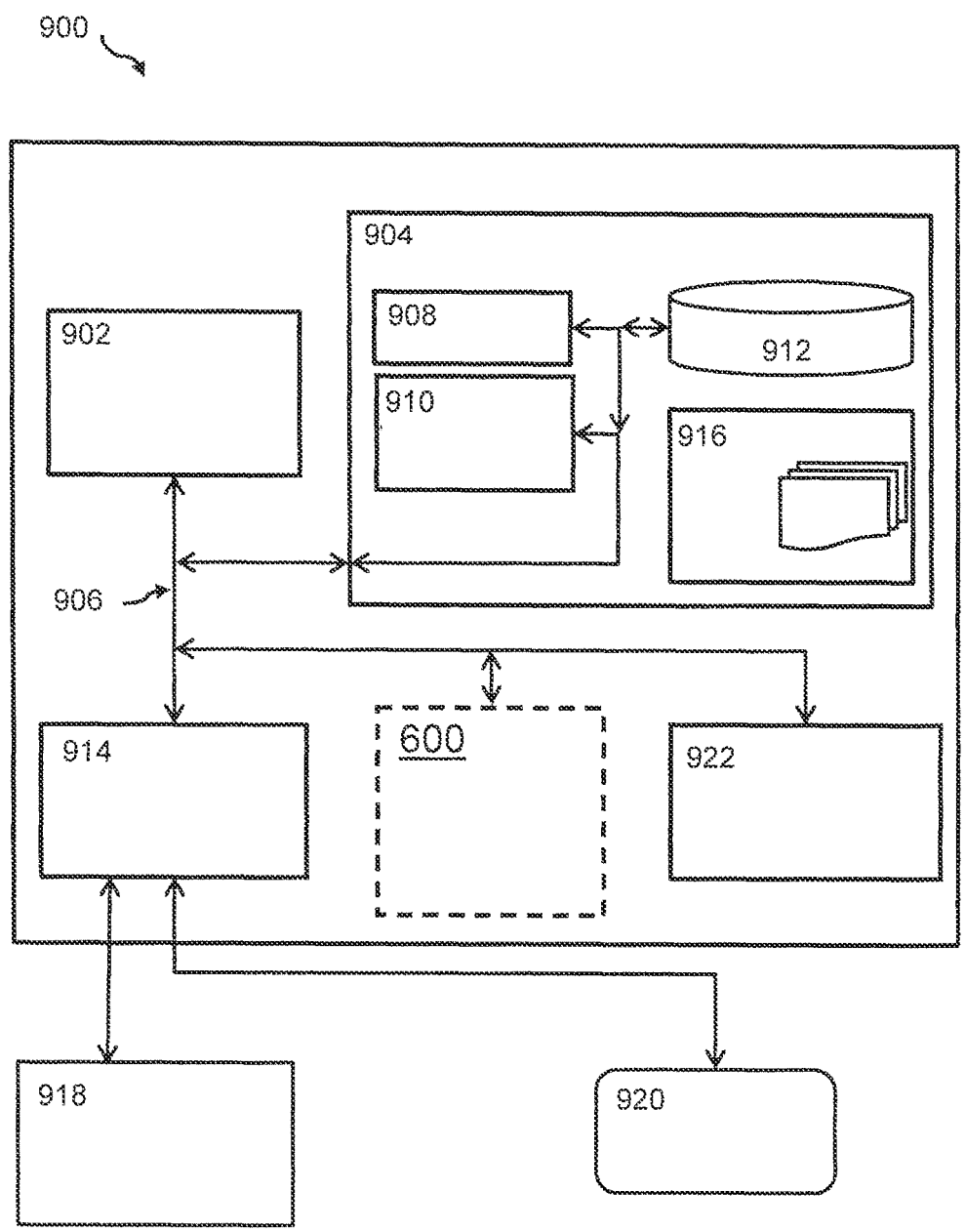
FIG. 9 shows an embodiment of a computing system comprising the partition function transfer system, in accordance with one or more aspects of the present invention.

Embodiments of the invention may be implemented together with virtually any type of computer, generally, regardless of the platform being suitable for storing and/or executing program code. FIG. 9 shows, as an example, a computing system 900 suitable for executing program code related to one or more aspects of the present invention. z/Architecture-based hardware is one example of hardware to comply to the concept of partitioning functions; however other architecture-based hardware may also comply to the concept of partitioning functions.

The computing system 900 is only one example of a suitable computer system and is not intended to suggest any limitation as to the scope of use or functionality of embodiments of aspects of the invention described herein, regardless, whether the computer system 900 is capable of being implemented and/or performing any of the functionality set forth hereinabove. In computer system 900, there are components, which are operational with numerous other general-purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couple various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, a storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the invention.

The program/utility, having a set (at least one) of program modules 916, may be stored in memory 904 by way of example, and not limiting, as well as an operating system, one or more application programs, other program modules, and program data. Each of the operating systems, one or more application programs, other program modules, and program data or some combination thereof, may include an implementation of a networking environment. Program modules 916 generally carry out the functions and/or methodologies of embodiments of the invention, as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of the computer system/server 900 via bus 906. It should be understood that, although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, the partition function transfer system 600 for transferring a partition function from a source system to a multi-tenant target environment may be attached to the bus system 906.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

It should be noted that embodiments of aspects of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of transferring a partition function, the computer-implemented method comprising:
    separating, as part of transferring the partition function from a source system to a remote multi-tenant target environment, physical and logical input/output (I/O) configuration settings of a partition image on the source system, wherein the logical I/O configuration settings are separated from the physical I/O configuration settings, and the logical I/O configuration settings are part of a subset of an input/output definition file and include one or more logical device numbers of one or more devices;
    moving the logical I/O configuration settings from the source system to the remote multi-tenant target environment comprising a plurality of target systems;
    selecting a dedicated target system of the remote multi-tenant target environment;
    adding physical information about hardware and connections of the dedicated target system to the logical I/O configuration settings;
    activating the logical I/O configuration settings combined with the physical information in the dedicated target system; and
    starting an operating system with the activated logical I/O configuration settings, wherein the partition function is transferred.

2. The computer-implemented method according to claim 1, wherein the operating system is of a selected hardware architecture, and wherein the partition function is represented by the operating system of the selected hardware architecture together with the logical I/O configuration settings, and wherein the dedicated target system has a physical architecture of the selected hardware architecture.

3. The computer-implemented method according to claim 2, wherein the operating system of the selected hardware architecture is one operating system selected from a plurality of operating systems based on the selected hardware architecture.

4. The computer-implemented method according to claim 1, wherein the source system and the dedicated target system are computing systems of different hardware generations.

5. The computer-implemented method according to claim 1, wherein different partition functions on the dedicated target system are strictly isolated against each other.

6. The computer-implemented method according to claim 1, wherein the separating the physical and logical I/O configuration settings of the partition image comprises reading the input/output definition file of the source system.

7. The computer-implemented method according to claim 1, wherein the selecting the dedicated target system comprises reading a placement policy file, wherein the placement policy file comprises runtime definition data selected out of a group consisting of isolated hardware, a dedicated channel subsystem, and a partition for a shared channel subsystem.

8. The computer-implemented method according to claim 1, wherein the selecting the dedicated target system comprises reading a placement policy file, wherein the placement policy file comprises adapter definition data selected out of a group consisting of shared adapters and dedicated adapters.

9. The computer-implemented method according to claim 1, wherein the moving the logical I/O configuration settings from the source system to the remote multi-tenant target environment comprises moving application data from the source system to the remote multi-tenant target environment.

10. The computer-implemented method according to claim 1, wherein the activating the logical I/O configuration settings comprises using configuration data comprising at least one selected out of a group consisting of a target location for the partition image, one or more adapters, physical cabling information, and access control information to application function and data.

11. A computer system for transferring a partition function, the computer system comprising:
a memory; and
at least one processor in communication with the memory, wherein the computer system is configured to perform a method, the method comprising:
separating, as part of transferring the partition function from a source system to a remote multi-tenant target environment, physical and logical I/O configuration settings of a partition image on the source system, wherein the logical I/O configuration settings are separated from the physical I/O configuration settings, and the logical I/O configuration settings are part of a subset of an input/output definition file and include one or more logical device numbers of one or more devices;
moving the logical I/O configuration settings from the source system to the remote multi-tenant target environment comprising a plurality of target systems;
selecting a dedicated target system of the remote multi-tenant target environment;
adding physical information about hardware and connections of the dedicated target system to the logical I/O configuration settings;
activating the logical I/O configuration settings combined with the physical information in the dedicated target system; and
starting an operating system with the activated logical I/O configuration settings, wherein the partition function is transferred.

12. The computer system according to claim 11, wherein the separating the physical and logical I/O configuration settings of the partition image comprises reading the I/O definition file of the source system.

13. The computer system according to claim 11, wherein the selecting the dedicated target system comprises reading a placement policy file, wherein the placement policy file comprises runtime definition data selected out of a group consisting of isolated hardware, a dedicated channel subsystem, and a partition for a shared channel subsystem, and wherein the placement policy file further comprises adapter definition data selected out of a group consisting of shared adapters and dedicated adapters.

14. The computer system according to claim 11, wherein the moving the logical I/O configuration settings from the source system to the remote multi-tenant target environment comprises moving application data from the source system to the remote multi-tenant target environment.

15. The computer system according to claim 11, wherein the activating the logical I/O configuration settings comprises using configuration data comprising at least one selected out of a group consisting of a target location for the partition image, one or more adapters, physical cabling information, and access control information to application function and data.

16. A computer program product for transferring a partition function, the computer program product comprising:
one or more computer readable storage media and program instructions collectively stored on the one or more computer readable storage media to perform a method comprising:
separating, as part of transferring the partition function from a source system to a remote multi-tenant target environment physical and logical I/O configuration settings of a partition image on a the source system, wherein the logical I/O configuration settings are separated from the physical I/O configuration settings, and the logical I/O configuration settings are part of a subset of an input/output definition file and include one or more logical device numbers of one or more devices;
moving the logical I/O configuration settings from the source system to the remote multi-tenant target environment comprising a plurality of target systems;
selecting a dedicated target system of the remote multi-tenant target environment;
adding physical information about hardware and connections of the dedicated target system to the logical I/O configuration settings;
activating the logical I/O configuration settings combined with the physical information in the dedicated target system; and
starting an operating system with the activated logical I/O configuration settings, wherein the partition function is transferred.

17. The computer program product according to claim 16, wherein the separating the physical and logical I/O configuration settings of the partition image comprises reading the I/O definition file of the source system.

18. The computer program product according to claim 16, wherein the selecting the dedicated target system comprises reading a placement policy file, wherein the placement policy file comprises runtime definition data selected out of a group consisting of isolated hardware, a dedicated channel subsystem, and a partition for a shared channel subsystem, and wherein the placement policy file further comprises adapter definition data selected out of a group consisting of shared adapters and dedicated adapters.

19. The computer program product according to claim 16, wherein the moving the logical I/O configuration settings from the source system to the remote multi-tenant target environment comprises moving application data from the source system to the remote multi-tenant target environment.

20. The computer program product according to claim 16, wherein the activating the logical I/O configuration settings comprises using configuration data comprising at least one selected out of a group consisting of a target location for the partition image, one or more adapters, physical cabling information, and access control information to application function and data.

* * * * *